United States Patent [19]
Doring
[11] 3,917,284
[45] Nov. 4, 1975

[54] REPRODUCING UNIT AND SOUND CARRIER FOR USE WITH PAGES OF A BOOK AND THE LIKE

[76] Inventor: Erich Heinrich Doring, Langer Weg 3, 8052 Moosburg (Isar), Germany

[22] Filed: July 30, 1973

[21] Appl. No.: 383,505

[30] Foreign Application Priority Data

Feb. 19, 1973 Italy ................................ 67397/73

[52] U.S. Cl. ................................................ 274/9 C
[51] Int. Cl.² ........................................ G11B 25/04
[58] Field of Search ...................................... 274/9; 353/15–19, 126

[56] References Cited

UNITED STATES PATENTS

| | | | |
|---|---|---|---|
| 3,190,174 | 6/1965 | Field | 353/85 |
| 3,193,295 | 7/1965 | Isemura | 274/9 D |
| 3,302,520 | 2/1967 | Dimitracopoloi | 274/9 C |
| 3,521,007 | 7/1970 | Laghari | 179/100.2 HT |
| 3,702,032 | 11/1972 | Doring | 274/9 C |

FOREIGN PATENTS OR APPLICATIONS

| | | | |
|---|---|---|---|
| 1,422,038 | 10/1968 | Germany | 274/9 C |

*Primary Examiner*—Richard E. Aegerter
*Assistant Examiner*—A. Jason Mirabito
*Attorney, Agent, or Firm*—Edward F. Connors

[57] ABSTRACT

An electrically operated sound reproducing unit is removably positioned in playing relation with a sound carrier or audio medium, that is affixed in selective fashion by a user onto the page of a book or the like, by interengaging alignment means provided on the reproducing unit and the sound carrier and cooperating switch means is carried by the reproducing unit and the sound carrier so as to activate the reproducing unit only when it is properly positioned on the sound carrier.

22 Claims, 14 Drawing Figures

REPRODUCING UNIT AND SOUND CARRIER FOR USE WITH PAGES OF A BOOK AND THE LIKE

BACKGROUND OF THE INVENTION

1. Field of the Invention

The present invention generally appertains to new and novel improvements in audio play-back systems and especially relates to a new and novel reproducing unit and sound carrier arrangement for use in association with pages of a book or the like.

2. State of the Art.

It is frequently desirable and even necessary for some instruction purposes and, more particularly, for self-instruction purposes, as well as for the entertainment of children, to complete and augment illustrated and written matter by auditory information. For this reason, it is conventional practice for disc type records or recording tapes, which are played back by the user in accordance with a specified plan correlated with the contents of the book, to be attached to such books for self-instruction or entertainment. The complicated handling of loose recording discs and tapes, more particularly the playing back of such audio media coordinated with the progressive page by page handling of a book, is a difficult, if not impossible task, for children. Therefore audio mediums have been provided to be fixedly attached to the pages of a book, where such attachment may be performed during manufacture or may be left to the purchaser of the book who obtains the audio media separately from the book. Such an audio medium or sound carrier is adhesively fixed on a page of a book. It may have a round or square shape with a rounded top part and its reverse face or side may have an adhesive covering which is overlied by a protective film that need merely be pulled off before the audio medium is adhesively fixed on to a book page.

Such an audio medium or sound carrier is disclosed in my prior U.S. Pat. No. 3,702,032, issued Nov. 7, 1972 and which is incorporated herein by reference.

There are several types of reproduction devices that can be used with such an audio medium or sound carrier. One such reproduction device is disclosed in U.S. Pat. No. 2,486,662, issued Nov. 1, 1949.

In known audio play-back apparatus or reproducing units suitable for playing back such audio media or sound carriers which are affixed to pages of a book, the underside of the apparatus, which is electrically operated by means of a built-in battery after being switched on, is provided with an audio pick-up head which is lowered from a retracted position and is rotated by a motor about a spindle which is perpendicular to the audio medium. The needle or stylus of the audio pick-up head scans the audio groove by tracking in or following the same.

In order to enable such audio play-back apparatus to be more readily placed upon the audio medium in the correct position, the latter is provided with register or alignment means and the audio play-back apparatus is provided with mating or interengaging register means which interengage. The audio medium may be provided with register apertures or with a projecting annular rib or a guide groove as a marker or as a register or alignment means outside the audio groove or the audio recording surface. The audio play-back apparatus has register or alignment feet which function as mating or interengaging register means and either fit into the register holes or just grip over the edge of the upwardly extending rib. The play-back apparatus or unit may be provided with a recess or with a rib which is also circular and is adapted to grip over the vertical guide rib.

After the audio play-back apparatus or reproducing unit is placed in the correct position upon the audio medium or sound carrier on the book page, the play-back apparatus is switched on by actuating a manual switch, usually provided on the top, whereupon the audio pick-up head automatically lowers itself from its retracted position onto the audio medium to scan the latter. Scanning of the audio groove may be followed by automatic switching off in the same way as in conventional record players, the audio pick-up head being automatically returned into its retracted starting position.

Such use of such audio play-back apparatus suffers from the disadvantage of involving the risk that the audio play-back apparatus may be switched on even though it does not seat in the correct position on the audio medium which is to be played back. Moreover, the very sensitive audio pick-up stylus or needle may come into contact with table surfaces, book pages, edges of audio media and the like and may thus be damaged. This risk also occurs if the interengaging or interfitting register means between the sound carrier and the reproducing unit cannot be readily engaged with each other so that the play-back apparatus or unit could be switched on before it is coordinated in the correct position relative to the audio medium or sound carrier.

SUMMARY OF THE INVENTION

It is an object of the present invention to provide an audio play-back system of the kind mentioned hereinbefore for the audible play-back of recordings on an audio medium in sheet form wherein the audio pick-up element is set in motion only when it is in the proper position in relation to the sound carrier or may be maintained in motion after an initial start only if the play-back apparatus or reproducing unit is correctly positioned and remains so positioned on the audio medium or sound carrier.

The present invention relates to an audio play-back system comprising a thin, flat disc-shaped or leaf-shaped audio medium or sound carrier having a sprial audio groove and register or positioning means disposed outside the audio groove and an electrically operated audio play-back apparatus or reproducing unit that is positionable in the correct playing position on the audio medium by virtue of mating register placement or positioning means. The audio pick-up element or pick-up head of the said audio play-back apparatus or reproducing unit is placed upon or lowered onto the audio medium from a retracted position after switching on of the apparatus and is rotated by a motor about a shaft which is disposed perpendicularly to the audio medium, while following the audio groove.

The problem described in the foregoing is solved by the present invention in that the starting circuit of the motor of the play-back apparatus is provided with a switch which can be switched on or placed in an "on" position only by the audio medium from the underside of the apparatus in proper contact with the audio medium. The starting circuit refers to the circuit of the audio play-back apparatus by means of which the motor is permanently switched on, either directly or indirectly. For direct switching the switch according to the invention is connected directly or in series with a manually operated switch of the apparatus in the working circuit of the motor comprising the battery to which an amplifier for the audio play-back is also connected by a loudspeaker which is provided in the casing of the apparatus if the play-back apparatus is arranged for such direct sound reproduction. The starting circuit may also be a self-holding circuit for the motor or may be a control circuit or a current pulse circuit for a current pulse relay whose contacts are connected in the working circuit of the motor.

The advantage of the system of the present invention is that the audio play-back apparatus can be switched on or the audio pick-up element can reach its final operating position only if the play-back apparatus or reproducing unit is placed in the correct position on the audio medium or sound carrier. This avoids any possibility of damage to the audio pick-up element or of its stylus resulting from switching on of the apparatus without it being correctly coordinated with the spiral audio groove or the like on the audio medium.

In a preferred embodiment of the invention, such switch comprises contact members carried by the play-back apparatus or unit and the audio medium or sound carrier has at least one electrically conductive contact covering which is coordinated in the correct position to the aforementioned switch contact members so that they may be bridged when the play-back apparatus is placed in proper position. If a single contact covering is provided on the audio medium, it is sufficient if two switch contact members are provided in the play-back apparatus which are connected in the starting circuit and are bridged by the contact covering when the play-back apparatus is properly placed in correct position on the audio medium or sound carrier.

In this way it is possible to construct a switch which is actuated by the audio medium and is of very simple construction and does not substantially increase the thickness of the audio medium and therefore the thickness of the page of a book.

The electrically conductive contact covering may be placed either in a recess in the audio medium or mounted on the surface thereof. For example, it may be metallized or vacuum-deposited on the top of the audio medium or sound carrier. But it may also comprise a contact film or foil which is adhesively affixed onto the upper surface of the audio medium. It may also take the form of a metal plate which is embedded in the top surface of the audio medium. It may also be disposed on the underside of the audio medium in a position so that it underlies and covers at least one register hole. The contact covering can also be constructed as a strip which is disposed on the underside of the audio medium so as to cover two register holes. If the audio medium or sound carrier is constructed of transparent material, so that the reverse side on which it is applied is not substantially altered in appearance, the covering strip also can be used to mark the register holes more clearly.

In another form of the audio play-back system of the present invention, the audio medium is provided with two register or alignment apertures, that are, as far as possible, arranged at the front side which is nearest to the user, and the play-back apparatus is provided with two register or alignment feet which fit into the aforementioned apertures and with a third foot which is constructed as a support foot. But the latter may also be constructed as a register foot and the audio medium may be provided with a third register aperture adapted to cooperate with the last mentioned register foot. The location of at least two register apertures and complemental register feet at the front side of the audio medium, which would be closest to the user, offers the advantage of facilitating correct placement of the play-back apparatus for children because they are able to view both register feet and register apertures with one glance and the apparatus itself does not conceal the view of the register feet and the register apertures.

In another embodiment of the audio play-back system according to the present invention, correctly positioned placement of the reproducing unit upon an audio medium or sound carrier, which is of round construction, is made possible by virtue of the outer edge of the audio medium being extended slightly upwardly in the manner of a plate edge or rim. Preferably it is conical and the play-back apparatus is provided on its underside with a recess adapted to cooperate with such upwardly extending edge so as to just extend thereover. Or it may be provided with at least three supporting feet, the inside of which are preferably constructed in the form of a circular arc corresponding to the upwardly extending edge. To prevent the upwardly extending edge from projecting excessively upwardly from the page of a book on which the sound carrier is affixed, a further feature of the invention provides that the upwardly extending outer edge of the audio medium is formed with inwardly orientated cuts which facilitate pressing the edge down. Accordingly, the outer edge may be readily pressed down when the book is closed or when pages are turned so that the book is not thicker than a book on which flat sound carriers are mounted. The upwardly extending outer edge, however, facilitates correct positioned placement of the play-back apparatus because the register sectioning is higher and, therefore, more marked.

It is considered of advantage if the audio medium or sound carrier is constructed of transparent plastics materials because then it may be affixed on printed pages without covering over and concealing printed matter or pictorial illustrations printed on the pages. If such an audio medium or sound carrier is constructed in the form of a film, a paper strip or sheet may be appropriately fixed on its underside within the outer edge and have printed thereon the text or a portion of the text of the book page on which the audio medium is to be adhesively affixed so as to simultaneously provide an indication of the position on the book page on which the audio medium is to be mounted.

In one embodiment of the system according to the present invention, the contact covering and the bridging switching contacts are provided on the reverse side of the audio medium which faces away from the user and the play-back apparatus. Since the play-back apparatus or unit is generally placed upon the audio medium or sound carrier by slight forward tilting in order to locate the register means it can be realized that the rearward contact covering is not touched in this embodiment and is protected. The contact covering is appropriately provided between two cuts if the upwardly extending outer edge of the audio medium is provided with cuts.

However, the contact covering may also be disposed on the underside of the audio medium so as to underlie at least one register aperture in a way so that the said contact covering is in a protected position and enabling the switch contact means to be carried by one of the register feet. In such arrangement, the play-back apparatus has a downwardly extending tube or hollow stud on the lower end of which the switching contact members are resiliently placed. The switch contact members are provided within or on a supporting foot or a register foot. The two switch contact members may also be provided on the two feet to which electrically connected contact coverings on the audio medium or sound carrier are coordinated. It is then not necessary to provide two switch contact members in one register foot or one supporting foot.

The switch contact members may be rigid or resilient and they may also terminate in contact spikes. If rigid switch contacts are used, the stud or register foot with the switch contacts is shortened relative to the others to enable the audio play-back apparatus to be mounted in the correct position.

A plurality of contact coverings may be provided on the audio medium or sound carrier and the play-back apparatus or reproducing unit then is provided with a plurality of serially connected switch contact member pairs in the starting circuit. This provides increased reliability against unintentional switching on.

The play-back apparatus may bear upon the register feet and its underside to which end the latter is recessed relative to the register feet by more than the thickness of the audio medium.

The switch contact members may be mounted on the end face of a push element on which an actuating element, more particularly an actuating element of the switch for the play-back apparatus, acts directly or through a thrust element to bring the switch contact members into contact with the contact covering. To this end, the switch may be constructed as a push switch or as a rocker switch so that the switch contact members are briefly brought into contact with the contact covering when the said switch is actuated. A motor with a self-holding circuit or a current surge relay is thus actuated so that the motor continues to operate even after the switch is released.

In another embodiment of the invention, the run-in groove of the spiral audio groove in the audio medium may have a modulated pilot tone in addition to or as an alternative to the contact covering and the switch contact members and the audio play-back circuit may have a discriminator which switches on the play-back apparatus to continuous operation on reception of the pilot tone and switches off the said apparatus briefly after switching on in the event of non-reception of such note. Switching on of the play-back apparatus with the normal switch causes the audio pick-up element to be lowered onto the audio medium. For a distance of approximately 20 to 30 mm or more, for example, the audio pick-up generates the modulated pilot note which ensures that the apparatus is switched via the discriminator to continuous operation so that the apparatus continues to run. If on the other hand, the apparatus is placed on another surface, which is not an audio medium, and it is accidentally switched on, the audio pick-up element will be lowered, move for 2 to 3 cm on the surface. And then the apparatus is switched off because no modulated pilot note is generated.

In this construction of the audio play-back system, the audio medium may have audio grooves disposed between its run-in and run-out groove and recorded with a further modulated pilot tone and the discriminator may switch off the play-back apparatus or reproducing unit on the reception of a further pilot tone while leaving the audio pick-up element at the appropriate position. The apparatus will then continue to operate at the affected position only after being again switched on. This embodiment is advantageous if individual questions are recorded on the audio medium and the listener is allowed time to consider a reply after such questions are posed without the audio pick-up element having to continue to move in the audio groove which would have to be unrecorded at that position. The next question would then follow after a defined and unvarying period of time. This construction enables the listener to extend the interval for any desired length of time and enables the audio groove to be kept short at that position and at all.

To improve engagement of the stylus of the audio pick-up element and to ensure reliable mechanical initiation of the switching-off process, the run-in groove and the run-out groove of the audio medium may be cut more deeply into the audio medium than the normal audio grooves.

In another form of the play-back apparatus, a stud of the audio pick-up element may be gripped by an eccentric disc cam at the end of a deepened run-out groove to raise the audio pick-up element and return it to the starting position. To this end, the stud of a tiltably supported audio pick-up element is mounted in such a way that tilting of the play-back apparatus to the front or to the rear through 30°–60°brings it into engagement with the eccentric disc cam. To switch it off, it is merely necessary to tilt the play-back apparatus in the forward direction. This arrangement is particularly advantageous if the front of the play-back apparatus is provided with two register studs which fit into two register apertures in the audio medium and the bridgeable switch contact members are disposed on the rear of the audio play-back apparatus because the user is then compelled first to place the apparatus with the two register feet at an angle and then to lower it at the rear onto the audio medium after register or alignment has been obtained. The apparatus is switched on only at the end of the said register or alignment operation by bridging of the switch contact members. The switch contact members themselves in association with the contact covering of the audio medium form the switch of the audio play-back apparatus. Therefore, it is not necessary for a further switch to be provided, as, for example, on the top of the play-back apparatus. A switch, constructed as "on-off" switch, will have to be provided, however, whenever it is desired to complete the play-back operation without the need for tilting the play-back apparatus or removing it from the audio medium.

DESCRIPTION OF THE PREFERRED EMBODIMENTS

Figure 1:
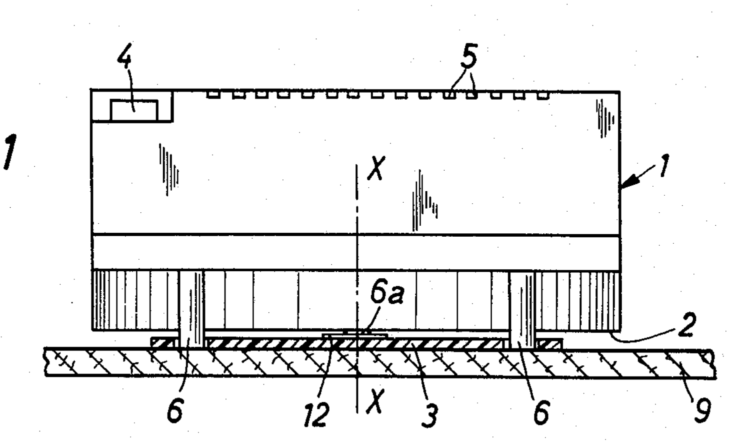
FIG. 1 is a front elevational view of a play-back apparatus or reproducing unit mounted in playing position on a sound carrier which is shown fixed onto a page of a book.

The audio play-back apparatus or reproducing unit 1 is of known construction and is provided on its underside 2, nearest to the audio medium or sound carrier 3 which is adhesively or otherwise fixed onto a book page 9, with a radially slidable audio pick-up head that rotates around a vertical spindle (not shown). When the apparatus 1 is switched on, the audio pick-up element emerges from its retracted position on the underside 2 and its audio pick-up stylus enters the spiral audio groove of the audio medium or sound carrier 3 in order to follow the latter while rotating about the center axis *x—x* of the driving spindle and sliding radially inwardly in the course of this motion. The top of the play-back apparatus 1 may be provided with a manually actuated on-off switch 4. A loudspeaker (not shown) is provided below apertures 5 for audio reproduction and is modulated by a play-back amplifier, connected to the audio pick-up head, when the apparatus is switched on.

The play-back apparatus 1 is provided with register or alignment feet 6 to enable it to be simply and reliably coordinated in the correct position to the audio medium 3. On its front side 8, nearest to the user, it is preferably provided with two register feet and on its rear side 7, away from the user, it is provided with one foot. The register feet 6 on the front side 8 are preferably disposed in adjacency at a slight distance from each other and are positioned in the same plane. All three feet form a three-point support by means of which the play-back apparatus 1 bears upon the audio medium 3 or on the book page 9 respectively on which the audio medium is applied. The threepoint support provides improved stability for the apparatus. To this end, the register feet 6 project by slightly more than the thickness of the audio medium 3 beyond the underside 2 of the play-back apparatus 1. If the audio medium or the book page were to be slightly corrugated the underside 2 of the play-back apparatus 1 would ensure that the audio medium is pressed flat at the edge.

The audio medium 3, the plan view of which may have any desired shape, is preferably constructed rectangularly on its obverse face according to one form and is circular on its reverse side. The front side is provided with two register apertures 10 into which the register feet 6 may penetrate when the play-back apparatus or reproducing unit 1 is in the proper position with respect to the audio medium or sound carrier 3. The distance between the register apertures 10 must of course correspond to the distance between the register feet which are provided on the apparatus 1.

Figure 2:
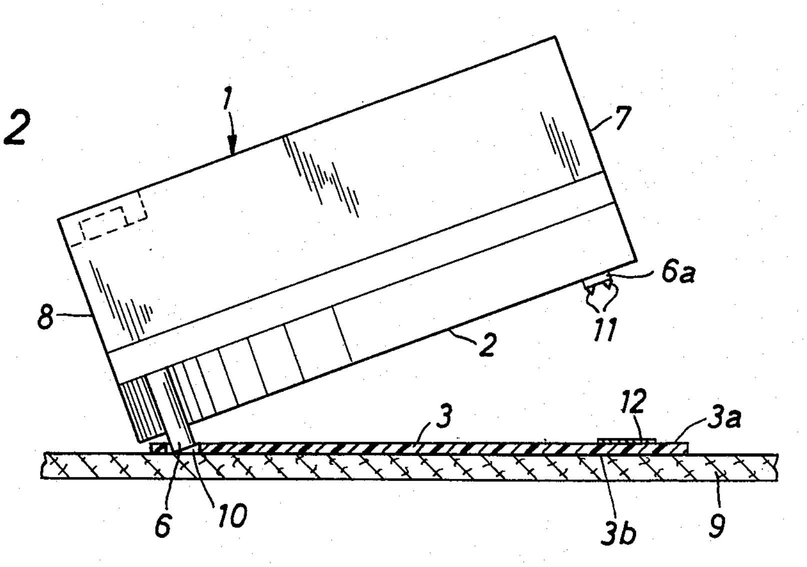
FIG. 2 is a side elevational view of the play-back apparatus or reproducing unit which is shown being lowered onto the sound carrier and is positioned thereon by its two front placement or positioning register feet.

As can be seen in FIG. 2, it is advantageous when installing the play-back apparatus 1 on the audio medium if the play-back apparatus 1 is initially held tilted at a forward angle and is inserted by means of the two front register feet 6 into the two register apertures 10. The apparatus may then be tilted rearwardly so that its rear side also bears on the audio medium 3 by means of the support foot 6*a*.

The rearward support foot 6a is preferably provided with a switch which is also incorporated into the play-back apparatus starting circuit that is the operating circuit and may be controlled only from the audio medium 3. This switch comprises two pointed switch contact members 11 which may be attached to or inserted in a rigidly or movably arrangment in the support foot 6a. The switch contact members 11 are preferably disposed close together in coplanar relation in a plane which extends parallel to the plane through the two register feet 6 on the front side of the play-back apparatus.

On the rear side the audio medium 3 is provided with an electrically conductive contact covering 12 in the form of a small metal plate which is applied to the top of the audio medium 3 and projects therefrom. However, such metal plate may also be recessed into the top 3*a* of the audio medium 3 or it may be constructed in the form of a metallized coating or a vacuumdeposited metal coating. It may also take the form of an adhesively affixed contact foil.

Figure 3:
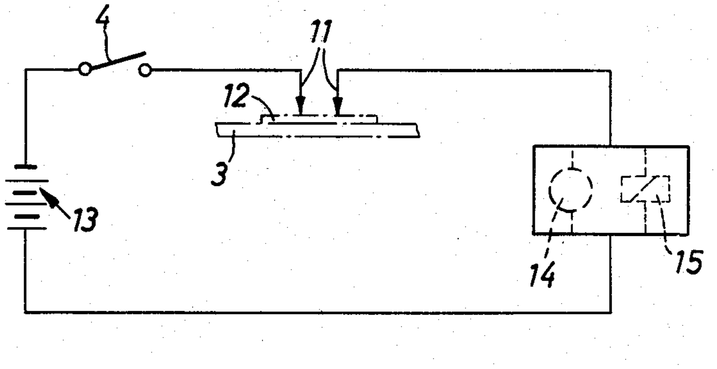
FIG. 3 is a diagrammatic showing of one embodiment of the starting circuit and operating circuit of the play-back apparatus or reproducing unit.
Figure 5:
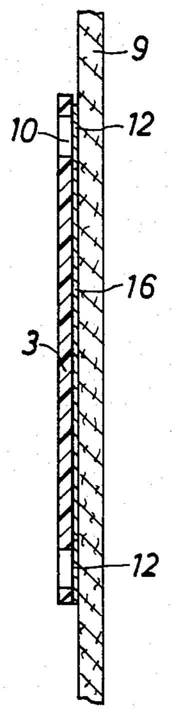
FIG. 5 is a cross-sectional view taken substantially on line V—V of FIG. 4.
Figure 4:
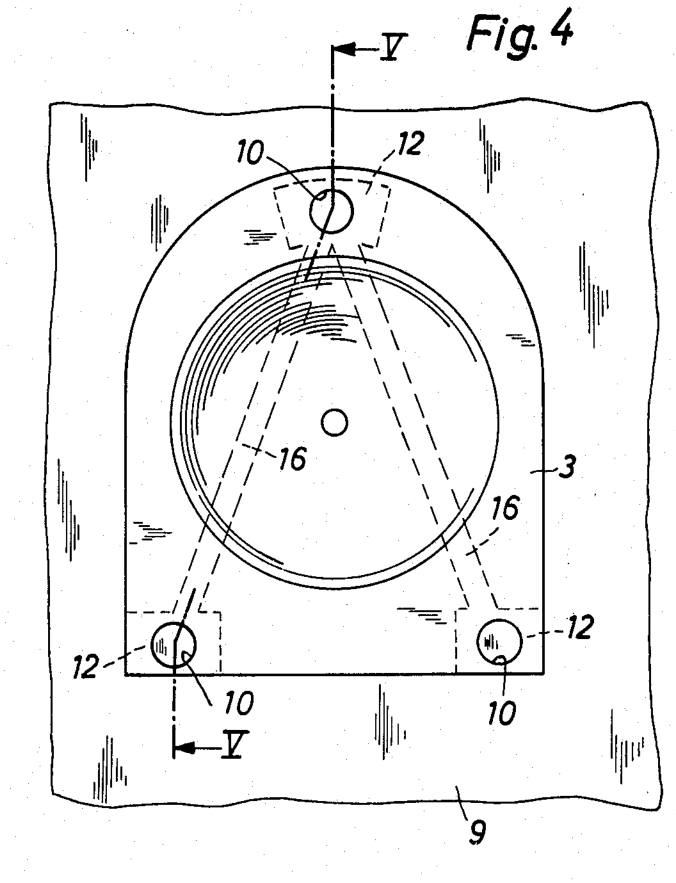
FIG. 4 is a plan view of one form of sound carrier or audio medium.

As can be seen in FIG. 3, the switch contact members 11, together with the contact covering 12, form a switch means which is closed only when the audio play-back apparatus 1 is placed in the correct or proper position on the audio medium 3 or sound carrier. Such switch means is connected in series with the on-oof switch 4 of the apparatus. It is possible to dispense with an on-off switch 4 if the circuit in all other respects basically corresponds to that shown in FIG. 3. The current source for the play-back apparatus is preferably a battery disposed therein. Such battery will supply electrical energy to drive the motor 14 when the switch 4 is closed and, where appropriate, will also feed electromagnetic lowering means 15 for the audio pick-up element.

It is also possible to provide the switch contacts 11 in pairs on a plurality of positions, for example on all three feet 6, 6*a*. To this end, the underside of the audio medium 3 is provided with an electrically conductive contact covering 12 at least below the register apertures 10. The two contact coverings which are distributed over the switch contact members provided in pairs must be connected to each other by means of a covering strip 16. If a plurality of switch contact pairs are provided on one foot, the coordinated contact coverings are not connected to each other but the switch contact pairs are connected in series.

Figure 6:
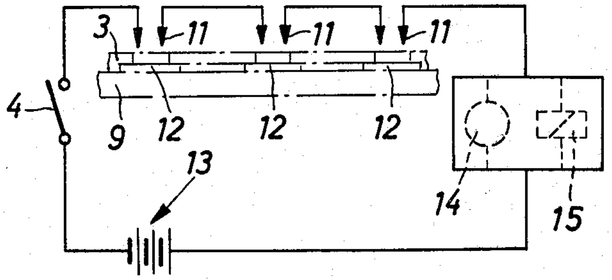
FIG. 6 is a diagrammatic showing of a modified form of starting circuit and operating circuit of the play-back apparatus or reproducing unit.

One embodiment with one pair of switch contact members 11, in which each of the three feet 6 and three coordinated contact coverings 12 are disposed on the audio medium, is indicated diagrammatically in FIG. 6. The three switch contact member pairs 11 are connected in series. This provides the advantage that the operating circuit of the apparatus may be switched on only if the apparatus is placed in the correct position on the audio medium 3 with all three register feet. However, this advantage is also obtained if only two switch contact member pairs are provided.

To ensure that the adhesively or otherwise affixed audio medium or sound carriers do not interfere with the optical read-out of the page of a book, it is proposed to construct the audio medium of transparent plastics materials. It is particularly advantageous for the register apertures of such an audio medium to be clearly marked by the electrically conductive contact covering on the underside of the said audio medium. To this end, the contact covering may be made in the form of strips which cover two adjacent register apertures 10. The two contact members 11 are then individually coordinated to the two associated register feet 6 so that the current flows from one contact member 11 into a contact covering 12 and from there via the connecting strip and the other contact covering to the other contact member 11.

Figure 7:
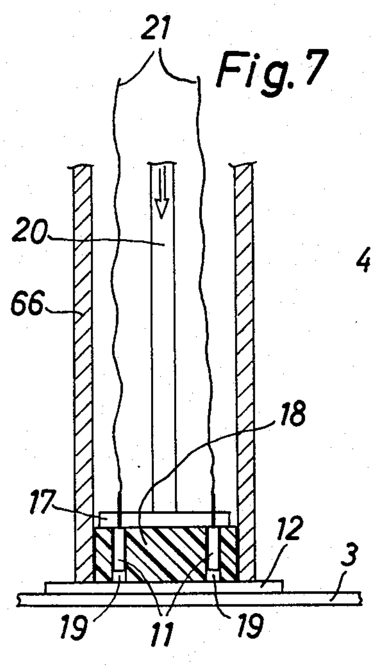
FIG. 7 is a vertical section through a hollow supporting foot of the reproducing unit showing it placed onto the contact covering of the audio medium or sound carrier and having longitudinally slidably retained switch contact members.

While the two contact members 11 in the embodiment of the play-back apparatus illustrated in FIG. 2 are disposed rigidly or resiliently below the support foot 6a, the latter is constructed as a tubular foot 66 in a modified embodiment according to FIG. 7. In such form, the two switch contact pins 11 are longitudinally guided in the said tubular foot 66. To this end, they are mounted on the underside on a contact support panel 17 of insulating material which bears on a rubber pad 18 with two longitudinal ducts 19 which are adapted to accommodate the switch contact pins 11. Rubber springs or other spring or restoring elements may be used in place of the rubber pad. The rubber pad 18 is slightly thicker than the length of the switch contact pins 11 so that they are normally spaced at a distance from the lower support surface of the support foot 66. A press stud 20 which functions as a plunger is mounted on the top of the contact support panel 17. Depressing of such press stud enables the two contact pins 11 to be brought into contact with the contact covering 12, affixed on the audio medium 13, so that the play-back apparatus may be switched on. The two contact pins are incorporated into the starting circuit of the operating circuit through leads 21 which rise in the tubular support foot 66.

The press stud 20 may either be operated in the manner of a push-button on the top of the play-back apparatus 1 or through a starting switch 4 constructed in the form of a push-button switch or rocker switch or the like which is actuated from the top of the play-back apparatus. The support foot 66 may also be a register foot 6. In such case the contact covering 12 must be provided on the underside of the audio medium 3 to span a register aperture 10. It is also possible to provide the foot 66 in addition to the register feet and support feet. In such case, the length of the foot will be such that it remains at a slight distance from the contact covering when the play-back apparatus is placed upon the audio medium. The position at which such a foot and the associated contact covering is provided may then be freely selected irrespective of the position of the other feet which are provided for register or alignment purposes and for reliably supporting the play-back apparatus.

Figure 8:
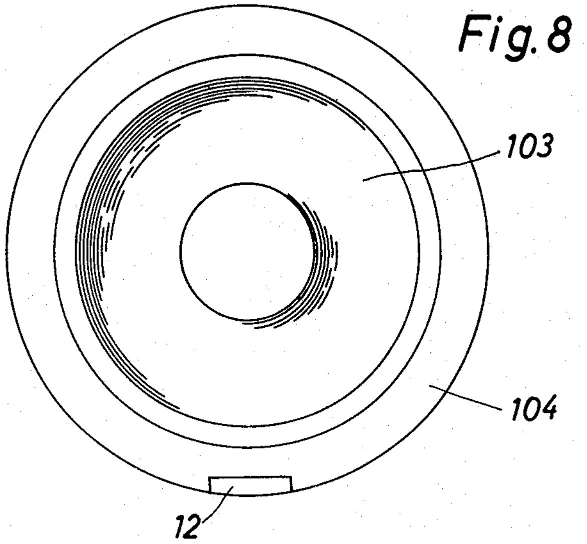
FIG. 8 is a plan view of a further form of audio medium or sound carrier.
Figure 9:
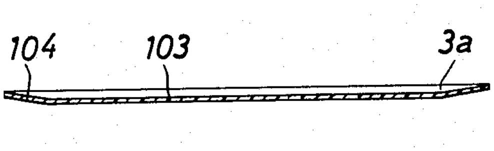
FIG. 9 is a cross-sectional view of the form of audio medium or sound carrier shown in FIG. 8.

Circular audio medium or sound carriers are illustrated in FIGS. 8 to 13. In these, the contact covering 12 is provided on the outer edge and on the top 3*a* of the audio medium. The audio medium 103, according to FIGS. 8 and 9, is upwardly extended on its outer edge 104 in a slightly tapered configuration in the manner of a plate edge so that the outer edge may function as a reliable stop or abutment edge for register or alignment means which are disposed on the underside 2 of the play-back apparatus.

In FIG. 9, the edge is shown extended upwardly in a greatly exaggerated form. The audio medium 103 is constructed as a thin film. This offers the advantage that the edge 104 may be reduced to a flat state when the book is closed so that the audio medium in its entirety hardly contributes to the thickness of the book. Reliable register is then also ensured even if the audio medium is extremely thin.

Placing the play-back apparatus and register relative to the audio medium in the construction according to FIGS. 1 to 6, requires an audio medium which has a specific minimum thickness. It is possible to reduce this thickness in the embodiment according to FIG. 9. To obtain register or alignment, the play-back apparatus may have a circular recess or three feet around the upwardly extended edge 104 so as to just extend over said edge. It will then be advantageous if the switch contact members 11 are provided rigidly, or resiliently or longitudinally slidable in a separate foot or on an inwardly projecting thickened portion of one of the three register feet.

Figure 10:
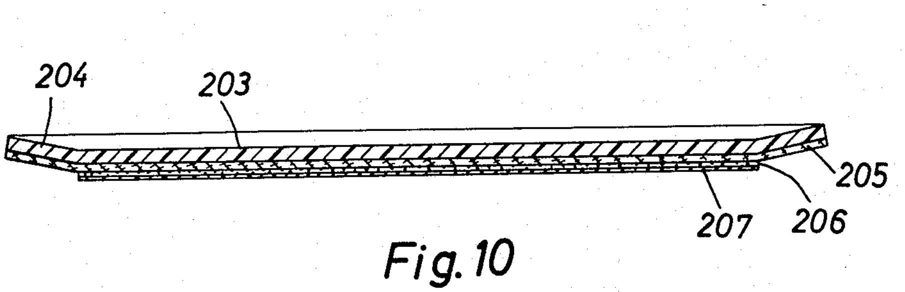
FIG. 10 is a cross-sectional view of another form of audio medium or sound carrier.
Figure 14:
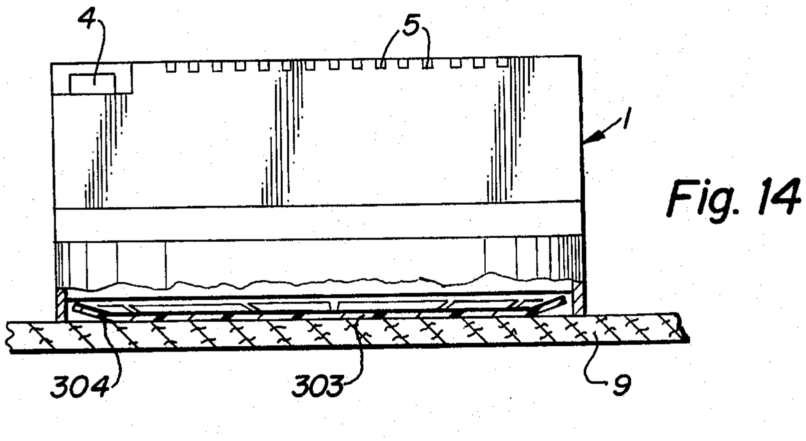

The form of audio medium or sound carrier 203, according to FIG. 10, differs from that of FIG. 9 only in that a printed paper sheet 205, printed on the top and having on the underside a self-adhesive stratum 206 which is covered by a protective film 207, is gluded on to the underside of the transparent audio medium film 203 with the spiral audio groove. The audio medium film 203 has an edge 204 which is extended upwardly in the manner of a plate. In this embodiment, the particularly thin audio medium film may be placed flat on the edge 204 when the book is closed.

Figure 11:
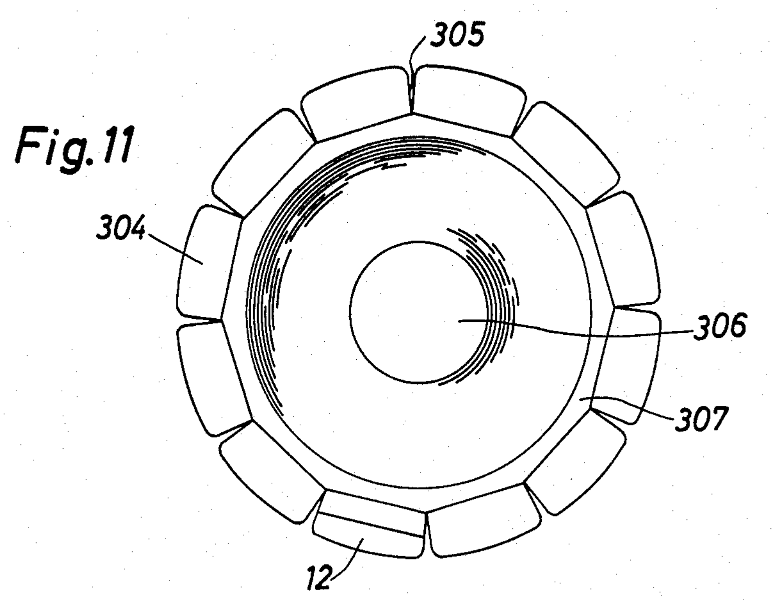
FIG. 11 is a plan view of a still further form of audio medium or sound carrier.
Figure 12:
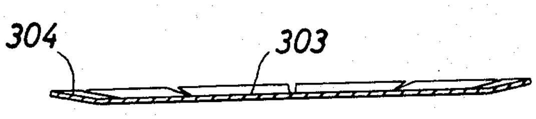
FIG. 12 is a cross-sectional view of the audio medium shown in FIG. 11.

FIGS. 11 and 12 show a further embodiment of an audio medium or sound carrier according to the invention. This embodiment differs from that of FIG. 9 substantially in that the audio medium 303 has an external edge 304, extending upwardly in the manner of a plate and provided with radially inwardly extending cuts or recesses 305. This construction facilitates the upwardly extended edge being placed flat and, therefore, enables thicker material to be employed for the audio medium. In this embodiment, the contact covering 12 is provided as a strip on the external edge 304 between two cuts 305. It could, of course, also be provided in the middle part 306 which is free of the audio groove or track or it may be provided on the unrecorded edge 305 outside the audio groove.

Figure 13:
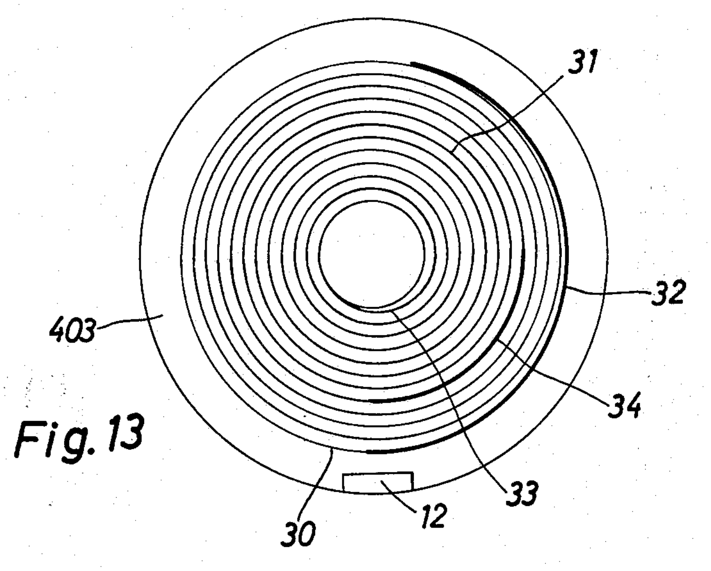
FIG. 13 is a plan view of an audio medium or sound carrier with a specially constructed run-in groove and run-out groove as well as of the remaining usual spiral audio groove.

The embodiment shown in FIG. 13 may serve as a further means for permanent switching on the play-back apparatus by the audio medium. According to such embodiment, a modulated pilot tone is recorded in the run-in groove 30 of the spiral audio groove 31 over a specific angular zone 32. If the apparatus is switched on and the audio pick-up head begins to scan the audio groove from the run-in groove, the modulated pilot tone will be transmitted first. The audio play-back circuit of the play-back apparatus is provided with a discriminator which discriminates the pilot tone from the other tones or noises and switches the play-back apparatus to continuous operation only on reception of the pilot tone.

The system is automatically switched off if no pilot tone is received within the aforementioned predefined period of time after switching on of the play-back apparatus. The electric circuits required to this end are known to the average expert or he may readily design such circuits on the basis of his expert knowledge. The starting safety device already described may be additionally provided for switching on of the apparatus, that is to say, a contact covering 12 may be provided on the outer edge of the audio medium and switch contact members 11 may be provided on one of the register feet 6. If the contacts are resiliently constructed, they may be moved manually by a push-button onto the contact covering 12 of the audio medium 403 so that they close the operating circuit of the play-back apparatus for as long as the start button is depressed. When the push-button is released, the switch contact members 11 spring back.

If the audio medium does not emit the modulated pilot note, the apparatus will not continue to operate. This provides a starting safety device if the play-back apparatus is placed onto a metal plate instead of an audio medium, where such a metal plate would also act in the manner of a contact cover 12 and would therefore simulate the switch contact members 11.

In one embodiment of the audio medium, further predefined zones 34 can be provided between the run-in groove 30 and the run-out groove 33. Such zones are also recorded with modulated pilot tones. The discriminator will then be so constructed that it switches off the play-back apparatus on reception of a further pilot tone while leaving the audio pick-up element at the appropriate position. This may occur for example after a question. Depressing the start button once again switches on the operating circuit so that the audio pick-up leaves the zone 34 and continues to operate.

The run-in groove 30 and the run-out groove 33 are cut more deeply to improve engagement and initiation of the automatic switch-off operation. It is then possible for a stud of the audio pick-up element to be gripped by an eccentric disc cam at the end of the deepened run-out groove, the said stud being raised and returned into the starting position. At the end of this groove the audio pick-up element interrupts the circuit and the apparatus stops. The audio pick-up will then be retracted into the initial start position in the casing.

The switch contact members 11 are not required if the starting switch produces a current pulse by means of which the apparatus is switched on through a current pulse relay for a short period, for example, half a second. If no modulated pilot tone is emitted during this period of time from the run-in groove the apparatus will stop. Alternatively, the output signal of the discriminator will cause the apparatus to be switched to continuous operation.

The switch contact members 11 may also be the contact members of a reed contact which is operated by magnetic force if the contact covering 12 if of magnetic material. Encapsulated reed contacts have the advantage of freedom from the ingress of dirt and of a long working life. Oxidation of the contact covering 12 does not impair the operational reliability.

While various embodiments of the present invention have been described herein and chown in the accompanying drawings, such are merely exemplary in nature and purpose and the present invention is only defined in and delimited by the spirit and scope of the appended claims.

What is claimed is:

1. An audio play-back system comprising a substantially flat and thin audio medium having an upper surface provided with an audio means and having alignment means disposed outside the audio groove means, an audio reproducing unit having alignment means adapted to register with the alignment means on the audio medium so as to properly position the reproducing unit in playing relation on the upper surface of the audio groove means, said reproducing unit having an audio pick-up element that is moved from a retracted position into playing engagement with the audio groove means when the reproducing unit is properly positioned on the audio medium, said pick-up element being rotated by a shaft and a motor housed in the reproducing unit for driving said shaft, said motor having a starting circuit, and a switch means for said starting circuit that can be switched on only from the underside of the reproducing unit by coaction of the audio medium with the underside of the reproducing unit facing the audio medium when the reproducing unit is properly positioned on the audio medium so as to start the motor and to keep the motor running only when the reproducing unit is in the correct position relative to the audio medium.

2. Audio play-back system according to claim 1, characterized in that the switch means comprises contact members protruding from the underside of the reproducing unit and at least one electrically conductive contact carried by the audio medium and which is coordinated in the correct position to the switch contact members so that they are bridged when the reproducing unit is placed in correct position on the audio medium.

3. Audio play-back system according to claim 2, characterized in that the contact is metallised onto the upper surface of the audio medium.

4. Audio play-back system according to claim 2, characterized in that the contact is formed by a contact film which is adhesively affixed onto the upper surface of the audio medium.

5. Audio play-back system according to claim 2, characterized in that the contact is constructed as a small metal plate which is embedded into the upper surface of the audio medium.

6. Audio play-back system according to claim 1, characterized in that correctly positioned placement of the reproducing unit upon the audio medium which is of a round construction is made possible by virtue of the outer edge of the audio medium being extended slightly upwardly, and the reproducing unit being provided on its underside with a recess cooperating with the aforementioned upwardly extending edge and just extending thereover.

7. Audio play-back system according to claim 6 characterized in that the upwardly extended external edge of the thin audio medium is provided with inwardly oriented cuts which permit said edge to be pressed down flat.

8. Audio play-back system according to claim 7 characterized in that the audio medium is constructed of transparent plastics materials.

9. Audio play-back system according to claim 8 characterized in that the audio medium is constructed in the form of a film having an adhesive underface and a paper is removably affixed over the underface.

10. Audio play-back system according to claim 7 characterized in that the contact is provided on the external edge between two of said cuts.

11. Audio play-back system according to claim 1 characterized in that the audio medium is provided with two register apertures, and the reproducing unit is provided with two register feet which fit into the aforementioned apertures and with a third foot which is constructed as a support foot and the contact is on the underside of the audio medium and is disposed under at least one register aperture bridging it.

12. Audio play-back system according to claim 11, characterized in that the reproducing unit has a downwardly extending stud on whose lower end the switch contact members are resiliently retained.

13. Audio play-back system according to claim 12, characterized in that the switch contact members are provided in or on a support foot or a register foot.

14. Audio play-back system according to claim 13, characterized in that there are at least two switch contact members which are provided on at least two feet, one on each foot and which are coordinated to electrically interconnected contacts on the audio medium.

15. Audio play-back system according to claim 14, characterized in that the switch contact members are resiliently constructed.

16. Audio play-back system according to claim 15, characterized in that rigid switch contacts are provided in a support foot or register foot which is shorter relative to the others.

17. Audio play-back system according to claim 16, characterized in that the switch contact members terminate in contact spikes.

18. Audio play-back system according to claim 2, characterized in that a plurality of contacts are provided on the audio medium and that the starting circuit of the play-back apparatus is provided with a plurality of switch contact pairs which are connected in series.

19. Audio play-back system according to claim 2, characterized in that the switch contact members are mounted on the end face of a thrust stud on which an actuating element for the starting circuit for the reproducing unit acts to bring the switch contact members into contact with the contact on the audio medium.

20. Audio play-back apparatus according to claim 1, characterized in that the audio medium has a run-in groove which has a modulated pilot tone and that the reproducing unit is provided with a discriminator which switches the reproducing unit to continuous operation on reception of the pilot tone and switches off briefly after switching on in the event of non-reception of the said tone.

21. Audio play-back system according to claim 20, characterized in that the audio means has a run-out groove and that between the run-in groove and the run-out groove the audio medium has audio grooves on which a further modulated pilot tone is recorded and the discriminator switches off the reproducing unit on reception of a further pilot tone while leaving the audio pick-up element at the appropriate position.

22. Audio play-back system according to claim 21, characterized in that the run-in groove and run-out groove are cut more deeply into the audio medium than the audio grooves to ensure better engagement of the scanning stylus of the audio pick-up element and for the more reliable mechanical initiation of the switching-off operation.

* * * * *